DIGITAL DATA REORDERING SYSTEM

Filed Jan. 16, 1968 3 Sheets-Sheet 1

INVENTORS.
CHARLES A. FINNILA,
DONALD S. KELLY,
BY Eric S. Cheng
AGENT.

Feb. 16, 1971 C. A. FINNILA ET AL 3,564,505

DIGITAL DATA REORDERING SYSTEM

Filed Jan. 16, 1968 3 Sheets-Sheet 3

United States Patent Office 3,564,505
Patented Feb. 16, 1971

3,564,505
DIGITAL DATA REORDERING SYSTEM
Charles A. Finnila, Culver City, Calif., and Donald S. Kelly, Framingham, Mass., assignors to Hughes Aircraft Company, Culver City, Calif., a corporation of Delaware
Filed Jan. 16, 1968, Ser. No. 698,306
Int. Cl. G06f 7/00
U.S. Cl. 340—172.5 18 Claims

ABSTRACT OF THE DISCLOSURE

A digital reordering system for generating and supplying to a single random access memory a plurality of memory address sequences having a predetermined numerical relationship which is a function of and corresponds to the number of data elements in a data array to be stored in said memory thereby enabling data to be stored in said memory in a first time series and retrieved in a second time series.

BACKGROUND OF THE INVENTION

This invention relates to a digital data reordering system which enables data arrays to be stored in a random access memory in a first time sequence of data elements and retrieved in a second time sequence of data elements. More particularly, the invention is directed to an improved method and apparatus for digital data reordering and for generating a plurality of memory addresses thereby enabling said digital data reordering to be conducted wherein said memory addresses have a predetermined numerical relationship which is a function of the number of data elements to be stored in said memory.

For some types of real time digital data processing, for example, digital radar data processing, input data may be referred to in terms of data arrays or batches. Defining a data array or batch as including N data sets, each set including M data elements, a data array would comprise MN data elements, among which would be the first data element of the first data set through and inclusive of the Mth data element of the Nth data set. Where data elements of a data array are presented for storage in a time sequence such as the first data element of the first data set, the first data element of the second data set, through the first data element of the Nth data set (the last set), followed by the second data element of the first data set, the second data element of the second data set, through the second data element of the Nth data set, sequentially followed by the third data elements of the first through Nth data sets and completed by all the Mth data elements of each data set, it may sometimes be more efficient and desirable to process a stored data array or batch by complete sets. Processing a stored data array or batch by complete sets would involve sequentially retrieving the data elements from the memory in which they are stored in a time sequence, such as, the first data element of the first data set, the second data element of the first data set, through the Mth data element of the first data set, followed by the first data element of the second data set, the second data element of the second data set, through the Mth data element of the second data set, and sequentially concluded by the Mth data element of the Nth data set.

Probably the best known technique of accomplishing the above described data reordering, wherein data arrays are processed in a time sequence of data elements which is different from the time-sequence of data elements in which incoming data arrays are presented for storage, is to use two separate storage devices, for example, random access memories. Each new data array to be stored is serially written into a first memory while a data array, which was previously stored in a second memory is serially retrieved for processing in the desired time sequence; each new data array being alternately stored in and retrieved from each of the two random access memories.

If there is a processing time provided for between the storage of each data array, a second technique would allow a single storage device, such as a random access memory, to be used. Each data array would be serially stored in the memory during the data collection time and serially retrieved during the processing time in the desired time sequence. It is clear that the second technique having a processing time provides the advantage of a reduction in the number of storage devices required and as such results in a reduction in overall cost. The use of the second technique, however, presents the disadvantage of requiring a longer time to perform the desired data storage and retrieval for processing. Further, the second technique presents the disadvantage of an inherent time limitation in which data may be either collected or processed, the result of which may be the wasting of potentially useful data which is unable to be stored during the collection time.

The present invention enables each stored data array to be retrieved in the desired time sequence for processing while new data arrays presented for storage are simultaneously stored. Each new data element serially presented for storage is stored in accordance with the invention, in the addressable storage location left vacant by the last retrieval of a data element. The data reordering technique of the subject invention thus requires only one memory operated in a read-write mode instead of one or more memories operated in write only and read only modes as required by the prior art techniques referred to hereinabove. The inventive reordering technique thus provides the advantage of equipment savings over conventional two memory systems as well as the advantages of speed and elimination of the processing time involved in conventional one memory systems.

Further advantages are provided by the use of a read-write mode in place of a write only and read only mode for each memory and the use of a memory having a smaller storage capacity which is made possible by the memory being continually filled with available data elements.

SUMMARY OF THE INVENTION

Briefly described, the present invention involves a digital data reordering technique for sequentially storing individual data elements of a data array in individual addressable storage location of a random access memory in a first time sequence of data elements and for sequentially retrieving stored data elements from their addressable storage locations in a second time sequence. In effect the desired mode of operation involving different storage and retrieval time sequences is accomplished in accordance with the invention, by sequentially retrieving individual data elements in the desired time sequence during the read half of the memory read-write mode and storing the next presented data element of a new data array during the write half of the read-write mode.

More particularly, the desired mode of operation is provided for by a digital data reordering system which includes an address register for storing memory addresses corresponding to the addressable storage locations in the random access memory, the memory addresses being sequentially applied to the random access memory thereby enabling the data element stored in the corresponding addressable storage location to be retrieved during the read half of the read-write mode and the next presented data element of a new data array to be stored, during the write half of the read-write mode, in the addressable storage location left vacant by the immediately preceding retrieval of the data element stored therein. A logic network is employed to continuously provide updated memory addresses for storage in the address register in accordance with a predetermined mathematical relationship which takes into consideration (1) the address of the storage location from which a stored data element was last retrieved and in which a new data element was stored, and (2) a sequence determining constant peculiar to each complete address sequence. If the number of addressable storage locations in a memory is equal to the number of data elements in a data arrary, a complete address sequence will include the address of every addressable storage location in the memory, a stored data element of a stored data array being retrieved from a new data element of a new data array being stored in each addressable storage location once in every complete address sequence. A second logic network is provided to supply updated sequence determining constants for each complete address sequence.

It is therefore an object of the present invention to provide an improved data reordering method for storing data in a memory in a first time sequence and retrieving the data from said memory in a second time sequence.

It is a further object of this invention to provide an improved data reordering system utilizing a single memory operated in a read-write mode.

Another object of this invention is to provide a system for generating a plurality of address sequences corresponding to the addressable storage locations in a random access memory allowing information to be stored in said memory in a first time sequence and retrieved from said memory in a second time sequence.

Still another obect of this invention is to provide a data reordering system operable with a data processing system and having a relatively small storage capacity requirement.

DESCRIPTION OF THE DRAWINGS

Other objects and many of the attendant advantages of this invention will be more readily appreciated as the same becomes better understood by reference to the following detailed description and considered in connection with the accompanying drawings in which like references symbols designate like parts throughout the figures thereof and wherein.

DESCRIPTION OF THE PREFERRED EMBODIMENT

Figure 1:
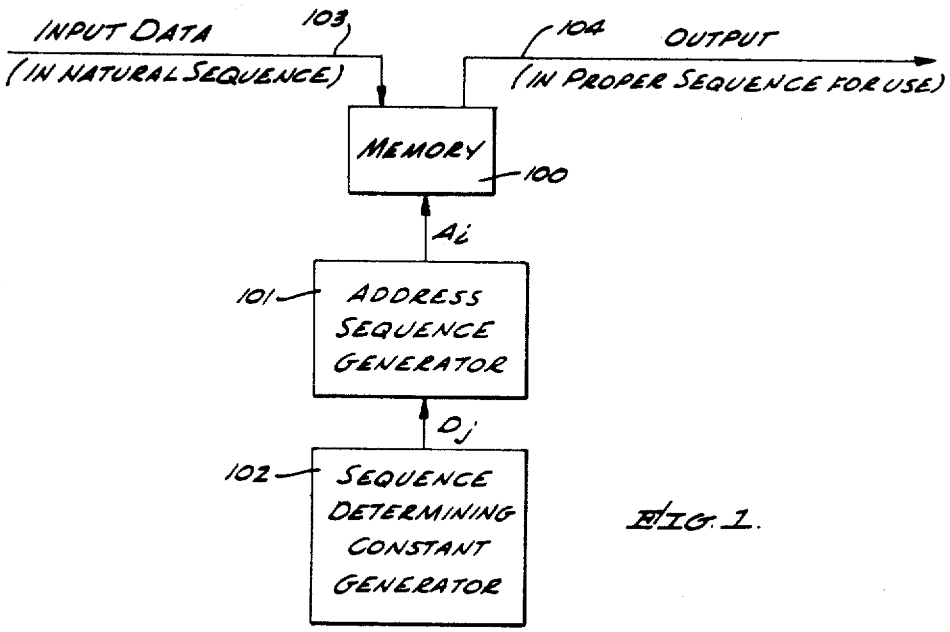
FIG. 1 is a block diagram illustrating a general configuration of a digital reordering system in accordance with the invention.

Considering input data to be stored in terms of data arrays wherein each data array includes a plurality of data sets and each data set includes a plurality of data elements, N is used to represent the total number of data sets in each data array and M is used to represent the total number of data elements in each of the N data sets. Each data array would thus include MN data elements and if, for example, a single data element is stored in each addressable storage location in a random access memory, there must be MN addressable storage locations in the random access memory, M and N being any integers. Adresses assigned to the respective addressable storage locations may thus, for example, range from 0 to $MN-1$, a different address being assigned to each of the MN addressable storage locations in said memory.

Where $A_i$ represents the $i$-th memory address in a required memory address sequence, if $$A_0=0 \quad (1)$$

then $$0 \leq A_j \leq MN-1 \quad (2)$$

For every data array, zero provides a convenient address for the first address, $A_0$ in every complete address sequence. Thus, an acceptable address sequence can be generated from $$A_i=A_{i-1}+{}^{*}{}_{MN}D_j \quad (3)$$

which address sequence is terminated by the address $$A_{(MN-1)}=MN-1 \quad (4)$$

The symbol $+^{*}_{MN}$ is used to mean additional modulo (MN) with a correction factor of 1, that is, whenever $$A_{i-1}+D_j \geq MN \quad (5)$$

then memory address, $A_i$ is set to $$A_i=A_{i-1}+D_j-MN+1 \quad (6)$$

$D_j$ is a sequence determining constant which is applicable to a single complete address sequence and which is changed for each succeeding address sequence.

In effect an address will never be a number larger than the number represented by $MN-1$ in that whenever an address, $A_i$, as determined by Equation 3 is greater than or equal to MN the quantity $(MN-1)$ is subtracted from the address.

Again starting with the relationship $A_0=0$ as was assumed for Equations 1 through 6, an identical address sequence may be generated for each data array using the relationship $$A_i=A_{i-1}+_{MN-1}D_j \text{ where } A_{i-1}+D_j \neq MN-1 \quad (7)$$

and $$A_i=MN-1 \text{ where } A_{i-1}+D_j=MN-1 \quad (8)$$

The symbol $+_{MN-1}$ is used to mean addition module (MN−1) without a correction factor, that is, whenever $$A_{i-1}+D_j \geq MN-1 \quad (9)$$

then memory address, $A_i$, is set to $$A_i=A_{i-1}+D_j-(MN-1) \quad (10)$$

Notably, as with an address sequence generated from Equation 3, an address sequence generated from Equations 7 and 8 is also terminated by $$A_{(MN-1)}=MN-1 \quad (11)$$

which address is defined by Equation 8.

Each sequence determining constant, $D_j$, is peculiar to a complete address sequence and is also a part of a numerical sequence, for example, $D_0$, $D_1$, through $D_j$. Assuming that $$D_0=1 \quad (12)$$

each $D_j$ is determined by the relationship $$D_j=D_{j-1}\times_{MN}N \qquad (13)$$

where the symbol $\overset{*}{\times}_{MN}$ is used to mean multiplication modulo (MN) with a correction factor, that is, whenever $$D_{j-1}\times N\geq MN \qquad (14)$$

then sequence determining constant, $D_j$, is set to equal the sum of the quotient and the remainder of the division $$(D_{j-1}\times N)\div MN \qquad (15)$$

As with the address sequences the sequence determining constants, $D_j$, may be generated by the alternate expression $$D_j=D_{j-1}\times_{MN-1}N \qquad (16)$$

where the symbol $\times_{MN-1}$ is used to mean multiplication modulo $(MN-1)$ without a correction factor, that is, whenever $$D_{j-1}\times N\geq MN-1 \qquad (17)$$

the sequence determining constant, $D_j$, is set to the remainder of the division $$(D_{j-1}\times N)\div(MN-1) \qquad (18)$$

It is to be noted that both the address sequences and the sequences of sequence determining constants, $D_j$, will be repetitive.

Referring to the drawings, the block diagram of FIG. 1 illustrates the major components of a digital data reordering system, in accordance with the invention. Input data is applied to a memory 100 over an input lead 103, stored data being retrieved from said memory 100 over a lead 104. Storage and retrieval of data from said memory 100 are performed in accordance with memory addresses applied to said memory 100 by address sequence generator 101 which is adapted to provide a series of memory addresses, $A_i$. Sequence determining constant generator 102 is adapted to continually provide sequence determining constants, $D_j$, to address sequence generator 101.

Figure 2:
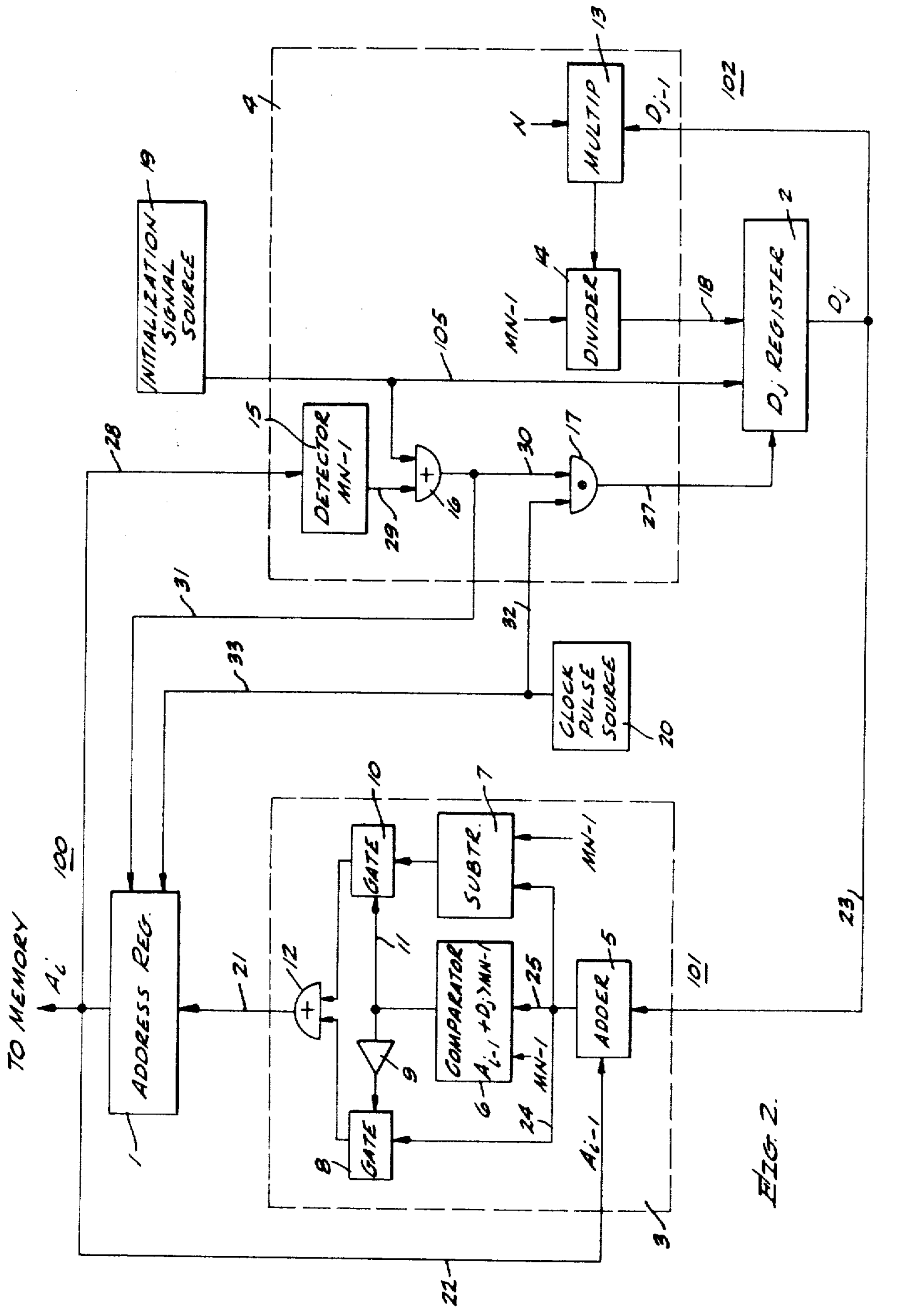
FIG. 2 is a block diagram illustrating a first embodiment of the system in accordance with the invention.

The block diagram of FIG. 2 illustrates an exemplary first embodiment of a digital data reordering system in accordance with the invention. The major components of the system include an address register 1, a sequence determining constant register 2, an address update network 3, and a sequence determining constant update network 4. Any of the conventional types of binary storage elements and logic networks suitable for use as registers may be employed for both register 1 and register 2.

Address update network 3 may include, for example, in accordance with the invention, a binary adder 5, a comparator 6, a subtractor 7, a first gate 8 adapted to receive an enabling signal applied from the comparator 6 through an invertor 9, a second gate 10 adapted to receive an enabling signal applied from the comparator 6 over a lead 11, and an OR gate 12 operatively coupled to both gate 8 and gate 10.

Sequence determining constant update network 4 may include, for example, in accordance with the invention, a multiplier circuit 13 which is operatively coupled to continuously receive signals stored in sequence determining register 2. Signals applied to multiplier 13 are modified by being multiplied by the data array parameter, N. Output signals from multiplier circuit 13 are applied to divider circuit 14 which serves to modify applied signals by division, the divisor being the memory constant, $MN-1$. The remainder resulting from the division performed by divider circuit 14 is applied over a composite lead 18 to sequence determining constant register 2 as an updated sequence determining constant, $D_j$. Notably, the updated sequence determining constant, $D_j$, will only be stored in $D_j$ register 2 upon the timely application of an enabling pulse to said register 2 over a lead 27. The enabling pulse is only applied to register 2 at the end of a complete address sequence, which end is determined by deteching the last address, $A_{(MN-1)}$, of each complete address sequence. This is accomplished by a detector circuit 15, which is operatively coupled to address register 1. In that $A_{(MN-1)}$ will always be $MN-1$, as previously indicated, the end of a complete address sequence is determined by detecting the quantity $MN-1$ which corresponds to the last address, $A_{(MN-1)}$, of each complete address sequence. The output of detector 15 is applied through an OR gate 16 to an AND gate 17 as one of two inputs, the second of said two inputs being a clock pulse provided by clock pulse generator 20 over lead 32. Upon the simultaneous application of both a clock pulse and a signal from the detector 15, the required enabling pulse is applied to $D_j$ register 2 over the lead 27. Clock pulse generator 20 is employed in a conventional manner to synchronize the operation of the address reordering system with the random access memory 100 (FIG. 1) to which addresses are supplied, and with the remainder of a data processing system (not shown). In addition to applying clock pulses to AND gate 17 over the lead 32, clock pulses are applied to address register 1 over a lead 33, which clock pulses serve to enable updated adddresses from update network 3 to be sequentially stored in and stored addresses to be sequentially read out of address register 1. Initialization signal source 19 provides an appropriate initialization signal to the address register 1 over a lead 31 through the OR gate 16 and to the $D_j$ register 2 over a lead 105 in order to set the respective registers to a desired value at the begining of each reordering operation (the beginning of the first address sequence). It is understood that standard logic and storage elements available in the prior art may be used in the mechanization of the circuits employed in the address reordering system illustrated in FIG. 2.

The address register 1 may be included as a part of the memory 100 of FIG. 1, the address sequence generator 101 may include the address update network 3 and the sequence determining constant generator 102 may include the sequence determining constant network 4 as well as the $D_j$ register 2.

The operation of the system illustrated by the block diagram of FIG. 2, will be summarized with reference to a specific example in which the data arrays to be stored and retrived each include three data sets (i.e., $N=3$), each data set including two data elements (i.e., $M=2$). A digital random access memory 100 which is employed to store the available data arrays would thus necessarily have at least six addressable storage locations or memory words, a single data element being placed in each addressable storage location.

TABLE I
[N=3; M=2]

| Address sequence | Sequence determining Constant number | Sequence determining constant value |
|---|---|---|
| 0 | $D_0$ | 1 |
| 1 | $D_1$ | 3 |
| 2 | $D_2$ | 4 |
| 3 | $D_3$ | 2 |
| 4 | $D_4=D_0$ | 1 |

Table I is included to show the respective values of each of the sequence determining constants $D_0$ to $D_4$ which will be generated in accordance with either Equation 12 or 15 for the exemplary data array. It is to be noted that sequence determining constant, $D_j$, can have only four different values for the assumed case and that if more than four $D_j$'s are used, for example, in the case where more than four data arrays are to be stored and retrieved, each additional series of four $D_j$'s (i.e. $D_4$ to $D_7$) will be a repetition of the initial four $D_j$'s (i.e., $D_0$ to ${}_3D$).

TABLE II

| Address sequence | Storage: Data array | Storage: Data set | Storage: Data element | Retrieve: Data array | Retrieve: Data set | Retrieve: Data element | Sequence determining constant | Memory address |
|---|---|---|---|---|---|---|---|---|
| 0 | 0 | 0 | 0 | | | | $D_0=1$ | $A_0=0$ |
| | 0 | 1 | 0 | | | | $D_0=1$ | $A_1=1$ |
| | 0 | 2 | 0 | | | | $D_0=1$ | $A_2=2$ |
| | 0 | 0 | 1 | | | | $D_0=1$ | $A_3=3$ |
| | 0 | 1 | 1 | | | | $D_0=1$ | $A_4=4$ |
| | 0 | 2 | 1 | | | | $D_0=1$ | $A_5=5$ |
| 1 | 1 | 0 | 0 | 0 | 0 | 0 | $D_1=3$ | $A_0=0$ |
| | 1 | 1 | 0 | 0 | 0 | 1 | $D_1=3$ | $A_1=3$ |
| | 1 | 2 | 0 | 0 | 1 | 0 | $D_1=3$ | $A_2=1$ |
| | 1 | 0 | 1 | 0 | 1 | 1 | $D_1=3$ | $A_3=4$ |
| | 1 | 1 | 1 | 0 | 2 | 0 | $D_1=3$ | $A_4=2$ |
| | 1 | 2 | 1 | 0 | 2 | 1 | $D_1=3$ | $A_5=5$ |
| 2 | 2 | 0 | 0 | 1 | 0 | 0 | $D_2=4$ | $A_0=0$ |
| | 2 | 1 | 0 | 1 | 0 | 1 | $D_2=4$ | $A_1=4$ |
| | 2 | 2 | 0 | 1 | 1 | 0 | $D_2=4$ | $A_2=3$ |
| | 2 | 0 | 1 | 1 | 1 | 1 | $D_2=4$ | $A_3=2$ |
| | 2 | 1 | 1 | 1 | 2 | 0 | $D_2=4$ | $A_4=1$ |
| | 2 | 2 | 1 | 1 | 2 | 1 | $D_2=4$ | $A_5=5$ |
| 3 | 3 | 0 | 0 | 2 | 0 | 0 | $D_3=2$ | $A_0=0$ |
| | 3 | 1 | 0 | 2 | 0 | 1 | $D_3=2$ | $A_1=2$ |
| | 3 | 2 | 0 | 2 | 1 | 0 | $D_3=2$ | $A_2=4$ |
| | 3 | 0 | 1 | 2 | 1 | 1 | $D_3=2$ | $A_3=1$ |
| | 3 | 1 | 1 | 2 | 2 | 0 | $D_3=2$ | $A_4=3$ |
| | 3 | 2 | 1 | 2 | 2 | 1 | $D_3=2$ | $A_5=5$ |
| 4 | 4 | 0 | 0 | 3 | 0 | 0 | $D_4=D_0=1$ | $A_0=0$ |
| | 4 | 1 | 0 | 3 | 0 | 1 | $D_4=D_0=1$ | $A_1=1$ |
| | 4 | 2 | 0 | 3 | 1 | 0 | $D_4=D_0=1$ | $A_2=2$ |
| | 4 | 0 | 1 | 3 | 1 | 1 | $D_4=D_0=1$ | $A_3=3$ |
| | 4 | 1 | 1 | 3 | 2 | 0 | $D_4=D_0=1$ | $A_4=4$ |
| | 4 | 2 | 1 | 3 | 2 | 1 | $D_4=D_0=1$ | $A_5=5$ |

Table II is included as a tabulation of the respective memory addresses which will be generated in accordance with either Equation 2 or Equations 6 and 7 for the exemplary data array, where five data arrays are to be stored and four data arrays are to be retrieved thereby requiring five address sequences which may, for example, be referred to as address sequences 0 to 4. The storage and retrieval of more than the exemplary number of data arrays would require the tabulation of an additional address sequence for each additional data array. It is to be noted that each series of four address sequences are repetitive, for example, address sequence 4 is identical to address sequence 0, address sequence 5 would be identical to address sequence 1, etc., which corresponds to the repetitive nature of the sequence determining constants, for example $D_4$ having the same value as $D_0$, and $D_5$ having the same value as $D_1$, etc. The memory addresses included in Table II correspond to the addressable storage locations illustrated in FIG. 3 which is intended as a graphical representation of a random access memory 100 having six addressable storage locations respectively labelled 90 through 95 and addressed as 0 through 5.

In that the random access memory 100 used in combination with the system of the invention is adapted to have a read-write mode, a data element stored in the addressable storage location having the generated address will be retrieved, after which the next data element presented for storage will be stored in that same addressable storage location vacated by the retrieved data element. Thus, referring to FIG. 3 and Table II, with regard to the first data array (array 0), the first data element (element 0) of the first data set (set 0) would be stored in the addressable storage location 90 addressed 0, the first data element of the second data set (set 1) would be stored in the addressable storage location 91 addressed 1, the first data element of the third data set (set 2) would be stored in the addressable storage location 92 addressed 2, the second data element (element 1) of the first data set would be stored in the addressable storage location 93 addressed 3, the second data element of the second data set would be stored in the addressable storage location 94 addressed 4, and the second data element of the third data set would be stored in the addressable storage location 95 addressed 5. It is to be noted from Table II that sequence determining constant $D_0=1$ would be applicable to the first address sequence. It is to be further noted that since the memory is initially empty, no retrieval takes place prior to the storage of each of the data elements of the first data array (array 0). However, for all subsequent data arrays, storage of each new data element will be preceded by retrieval of the data element stored in the addressable storage location in which the new data element is to be stored. Thus, again referring to FIG. 3 and Table II, with regard to the second data array (array 1), the first data element of the first data set would be stored in the addressable storage location 90 addressed 0 after the retrieval of the first data element of the first data set of the first data array, the first data element of the second data set would be stored in the addressable storage location 93 addressed 3 after the retrieval of the second data element of the first data set of the first data array, the first data element of the third data set would be stored in the addressable storage location 91 addressed 1 after the retrieval of the first data element of the second data set of the first data array, the second data element of the first data set would be stored in the addressable storage location 94 addressed 4 after the retrieval of the second data element of the second data set of the first data array, the second data element of the second data set would be stored in the addressable storage location 92 addressed 2 after the retrieval of the first data element of the third data set of the first data array, and the second data element of the third data set would be stored in the addressable storage location 95 addressed 5 after the retrieval of the second data element of the third data set of the first data array. It is to be noted that sequence determining constant $D_1=3$, as indicated in Table II would be applicable to the second address sequence. Similar read-write or retrieval-storage procedures would take place for succeeding data arrays as indicated in Table II. Thus, while new data arrays are stored in the random access memory in a first time sequence such as that enumerated hereinabove, previously stored data arrays are retrieved from the memory in a second time sequence which is different from said first time sequence.

Referring once again to FIG. 2 each address is temporarily stored in address register 1 prior to being provided to the memory decoding elements. Address update network 3 which provides each new address to the address register 1 over the composite lead 21, is adapted to receive two input signals. The first signal is received over the composite lead 22 and is representative of the memory address $A_{i-1}$ corresponding to the addressable storage location from which data elements were last retrieved and stored. The second signal is provided by sequence determining constant register 2 over the composite lead 23 and is representative of the sequence determining constant, $D_j$. Both the memory address signal and the sequence determining constant signal are applied as input signals to the adder 5 which performs an adding function and provides an output sum signal representative of the sum of the two inputs. The sum signal is applied simultaneously to the gate 8, comparator 6 and subtractor 7 over the composite leads 24, 25 and 26, respectively. The comparator 6 serves to compare sum signals applied as inputs thereto with memory constant, $MN-1$, an enabling signal having two binary levels—true and false—being developed and applied to gates 8 and 10, respectively, to selectively enable either of said gates depending on whether or not said sum signals are greater than said memory constant. The subtractor 7 serves to develop subtraction signals by modifying the sum signals applied as inputs thereto by subtraction, the value of said memory constant being subtracted from said sum signals. If the magnitude of a sum signal is greater than said memory constant, the developed enabling pulse assumes a true level and serves to enable the gate 10 resulting in the subtraction signal developed by the subtractor 7 being applied to the OR gate 12 through the gate 10. It is to be noted that each element such as gate 8, 10 and 12 of the network 3 responds to a plurality of bits to generate a multibit address. If the magnitude of a sum signal is not greater than said memory constant, the enabling pulse assumes a false level and serves to enable the gate 8 (instead of the gate 10) resulting in the sum signal appearing on the composite lead 24 being applied to the OR gate 12 through gate 8. The memory addresses applied to address register 1 over composite lead 21 will always correspond to an addressable storage location in the random access memory 100.

Sequence determining constants, $D_j$, applied over the composite lead 23 to the adder 5 from the sequence determining register 2 are also applied as input signals to the multiplier 13 in sequence determining constant update network 4. In that the sequence determining constant applied to the multiplier 13 is applicable to the data array last stored or in the process of being stored, said sequence determining constant when applied as an input to multiplier 13 may be given the designation $D_{j-1}$. The multiplier 13 serves to develop multiplier signals by modifying the signals applied as inputs thereto by multiplication, the input signals, $D_{j-1}$, being multiplied by the data array parameter N. The multiplier signal developed by multiplier circuit 13 is then applied to divider circuit 14, which serves to develop division signals—a quotient signal and a remainder signal—by modifying the multiplier signals applied as inputs thereto by division, the multiplier signals being divided by the memory constant $MN-1$. It is understood that it would be within the scope and spirit of the invention to in some cases reverse the order of multiplication and division. Such a case would, for example, be in a mechanization of Equation 15 which would involve dividing $D_{j-1}$ by the quantity M in order to obtain both a quotient and a remainder, which are added to develop a value of $D_j$ after the remainder has been multiplied by the quantity N.

A mechanization of Equation 13 would require utilization of both the quotient signal and the remainder signal, while a mechanization of Equation 16 would require utilization of only the remainder signal. In that the system of FIG. 2 is illustrative of an exemplary mechanization of Equation 16, only the remainder signal or signals is utilized by being applied as an updated sequence determining constant to sequence determining constant register 2. The remainder signal developed by divider circuit 14, however, is not stored in sequence determining constant register 2 unless an enabling pulse is provided to said register 2 over the lead 27. The enabling pulse which is applied to register 2 at the end of each complete address sequence is developed by the detector 15 which serves to detect the end of each complete address sequence, which end is signified by a memory address having the numerical designation, $MN-1$ (the memory constant). To this end, each memory address applied to the random access memory 100 from address register 1 is also applied to detector 15 over a composite lead 28, the detector 15 being adapted to provide an output signal over a lead 29 whenever the memory address $MN-1$ is detected. The detector output signal appearing over the lead 29, which may be regared as assuming a true level is applied as an input to the OR gate 16 resulting in a true signal being applied to the AND gate 17 over a lead 30. An enabling pulse having a true level is thereby provided by the AND gate 17 to the sequence determining constant register 2 whenever a clock pulse is simultaneously applied to said AND gate 17 over a lead 32. It is to be noted that the output signal provided by the OR gate 16 is also applied to the address register 1 over a lead 31 and serves to set said address register 1 to memory address 0 at the start of all address sequences subsequent to the first address sequence as well as at the beginning of the first address sequence. An initialization signal provided by the initializer 19 is employed to apply a signal through the OR gate 16 and thereby set the address register 1 to memory address 0 at the beginning of the first address sequence. Clock pulse generator 20 is adapted to provide clock pulses having a pulse reptition rate suitable for enabling the system of FIG. 2 to be operated, in accordance with the invention, in synchronizism with the other components of a data processing system. For example, clock pulse source 20 may be operated at the same four pulse period generally used in connection with conventional memory systems. Subclock pulses having a suitable repetition rate may be appropriately provided to the arthmetic units of address update network 3 and sequence determining constant update network 4 in a manner well known in the art enabling said arithmetic units to carry out the operations for which they are provided.

It is understood that in some instances where sequence determining constant $D_j$ has a limited number of different values, the sequence determining constants may be pre-calculated and stored in a stroage device such as a wired table memory which would take the place of sequence determining constant generator 102 (FIG. 1). The values of $D_j$ would then be appropriately applied as inputs to address undate network 3 included in address sequence generator 101 (FIG. 1), a counter being used to appropriately sequence through the storage device.

Figure 3:
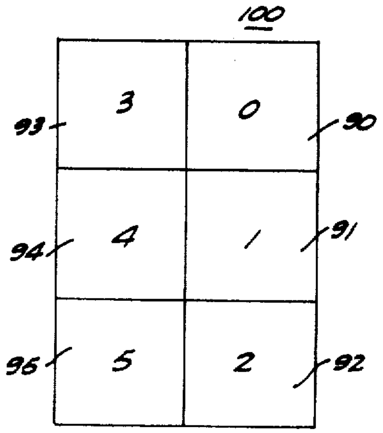
FIG. 3 is a graphical representation of a memory illustrating an exemplary address scheme for the addressable storage locations.

The digital reordering technique which has been described with reference to Equations 1 through 18 and FIGS. 2 and 3 may be employed, in accordance with the invention, in conjunction with digital processing systems which are especially adapted to accomodate data arrays having parameters, M and N, which are powers of 2. Considering such a case, let $$M=2^m \tag{19}$$

and $$N=2^n \tag{20}$$

Equation 13 becomes $$D_j=2^{d_j} \tag{21}$$

where $$d_0=0 \tag{22}$$

corresponding to $$D_0=1, \tag{23}$$

and $$d_j=d_{j-1}+_{m+n}n \tag{24}$$

The symbol $+_{m+n}$ is used to mean addition modulo $(m+n)$, that is, whenever $$d_{j-1}+n \geq m+n \quad (25)$$

then sequence determining constant exponent, $d_j$, is set to $$d_j = d_{j-1}+n-(m+n) \quad (26)$$
$$d_j = d_{j-1}-m \quad (27)$$

An acceptable address sequence may be generated by Equation 3 which becomes $$A_i = A_{i-1} +^{*}_{MN} 2^{d_j} \quad (28)$$

which address sequence is terminated by $$A_{(MN-1)} = MN-1 \quad (29)$$

The symbol $$+^{*}_{MN}$$

as in Equation 3, is used to mean addition modulo (MN) with a correction factor of 1, that is whenever $$A_{i-1}+2^{d_j} \geq MN \quad (30)$$

or $$A_{i-1}+2^{d_j} \geq 2^{m+n} \quad (31)$$

then memory address, $A_i$, is set to $$A_i = A_{i-1}+2^{d_j}-2^{m+n}+1 \quad (32)$$

Figure 4:
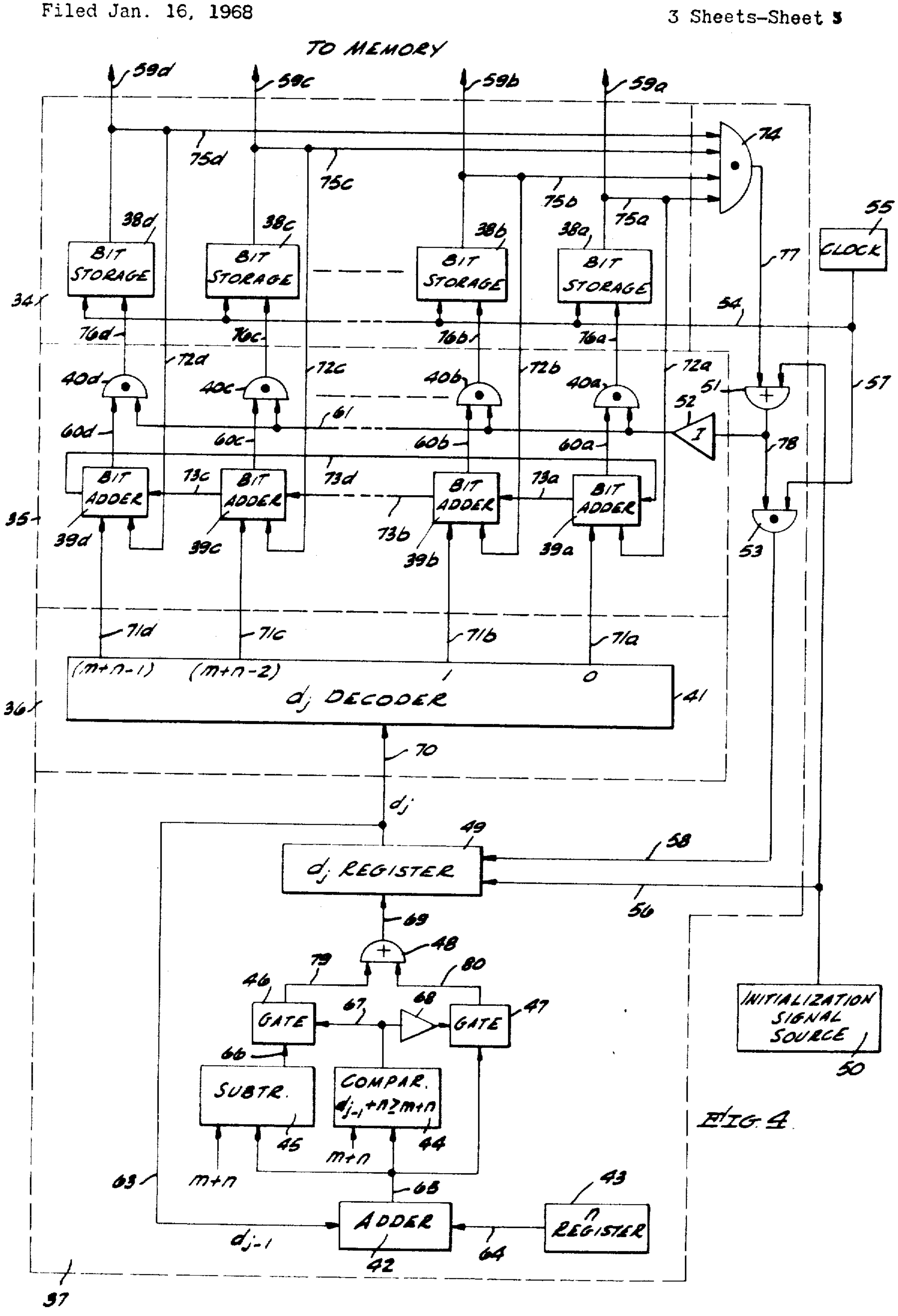
FIG. 4 is a block diagram illustrating a second embodiment of the system in accordance with the invention.

The schematic block diagram of FIG. 4 illustrates a second embodiment of a digital data reordering system, operable with powers of 2, in accordance with the invention. The major sections of the system, enclosed by broken lines, are a memory address register 34, a memory address update network 35, a sequence determining constant source 36, and a sequence determining constant update network 37. The address register 34 and other memory elements (not shown) may be included as a part of memory 100 (FIG. 1), the generator 101 (FIG. 1) and the source 36 and constant update network 37 may be included in the sequence determining constant generator 102 (FIG. 1).

More particularly, the address register 34 may include a plurality of bit storage devices 38*a*–38*d* which may comprise any of the types of flip-flop circuits well known in the prior art. The memory address update network 35 may include a plurality of bit adders 39*a*–39*d* and a plurality of AND gates 40*a*–40*d*, the number of which respectively corresponds to the number of bit storage devices 38*a*–38*d* employed in address register 34.

Sequence determining constant source 36 may include a decoder network 41 which may comprise a diode matrix such as the type described in a textbook written by Adelfio and Nolan, Principles and Applications of Boolean Algebra, Hayden Book Company, Inc., 1964, pages 232–234. The $d_j$ decoder 41 as shown is adapted to have a plurality of output leads labeled 71*a*–71*d*, each of which are representative of a single bit of a binary number. Lead 71*a* would in this case serve as the least significant bit while the remaining leads 71*b*–71*d* are progressively representative of more significant bits, lead 71*d* being thus representative of the most significant bit. It is understood that the required number of decoder output leads is a function of the number of data elements in a data array to be stored, said number of decoder output leads being equal to the quantity $(m+n)$. Thus, with reference to Equations 19 and 20, in an exemplary case where $N=4$ and $M=8$, then $n=2$ and $m=3$. As such $d_j$ decoder 41 would have, for example, five output leads allowing for five possible values of $D_j$ ranging from $2^0$ to $2^4$. The output leads may be considered as respectively having progressively numbered designations 0 through 4 in order of significant digits, in which case the lead 71*a* would be designated 0, the lead 71*b* as 1, the lead 71*c* as $(m+n-2)$ or 3, and the lead 71*d* as $(m+n-1)$ or 4. It should be now noted that functionally the decoder 41 is intended to have an output signal on only one of the output leads 71*a*–71*d*, the particular lead having the output signal being determined by the value of $d_j$ applied as an input over composite lead 70. For example, an input of $d_j=1$ would result in an output over lead 71*b* designated lead 1 and corresponding to $2^1$.

The sequence determining constant update network 37 is adapted to constantly provide updated values of $d_j$ to $d_j$ decoder 41, each $d_j$ being applicable to a single complete address sequence wherein $d_j$ and consequently $D_j$ is changed for each address sequence. Structurally, the sequence determining constant update network 37, as shown, may include elements similar in nature to those included in address update network 3 which is illustrated in FIG. 2. Included is an adder 42, an $n$ register 43, a comparator 44, a subtractor 45, a first gate 46, a second gate 47, an OR gate 48 and a $d_j$ register 49. The adder 42 performs an adding function and serves to provide an output sum signal representative of the sum of the two signals applied thereto. The first input signal is applied over composite lead 63 and in that said first input signal is representative of the sequence determining constant exponent applicable to the preceding address sequence, said first input signal may be designated $d_{j-1}$. The second input signal is representative of data array parameter exponent $n$ and is applied to adder 42 over composite lead 64 from $n$ register 43. The sum signal developed by the adder 42 is simultaneously applied to the comparator 44, the subtractor 45, and to the gate 47. The comparator 44 serves to compare sum signals applied as inputs thereto with a memory constant, $m+n$, an enabling signal having two binary levels—true and false—being developed and applied to the gates 46 and 47 to selectively enable either of said gates depending on whether or not said sum signals are greater than or equal to the memory constant $m+n$. The subtractor 45 serves to develop subtraction signals by modifying the sum signals applied as inputs thereto by subtraction, the value of said memory constant, $m+n$, being subtracted from said sum signals. If the magnitude of a sum signal is greater than or equal to said memory constant, the enabling pulse developed by the comparator 44 assumes a true level and serves to enable the gate 46 resulting in the subtraction signal developed by the subtractor 45 being applied to the OR gate 48 through the gate 46 in accordance with Equation 26. If the magnitude of a sum signal is not greater than or equal to said memory constant, the enabling pulse assumes a false level and serves to enable the gate 47 (instead of the gate 46) resulting in the sum signal developed by the adder 42 being applied to the OR gate 48 through the gate 47 in accordance with Equation 24. The subtraction and sum signals respectively applied to the OR gate 48 over composite leads 79 and 80 are applied through OR gate 48 to the $d_j$ exponent register 49 over composite lead 69, said signals being stored in the register 49 as updated values of $d_j$ provided an enabling signal is applied to register 49 from an AND gate 53 over the lead 58. The updated values of $d_j$ which are stored in the register 49 are subsequently applied to the $d_j$ decoder 41 over composite lead 70.

The initialization signal source 50 is employed to provide an initialization signal, which is applied to both the $d_j$ register 49 and to the OR gate 51 at the start of the first address sequence. The initialization signal, which may be considered as a true signal for purposes of this description, serves to set $d_j$ register 49 to zero $(d_0=0)$. It should be noted, with reference to Equations 21, 22 and 23, that setting $d_j$ register 49 to zero, resulting in $d_0=0$, is necessary to have $D_0=1$. The initialization signal, when applied to the OR gate 51, further serves to cause said OR gate 51 to provide a true output signal, which signal is applied to an inverter 52 and to the AND gate 53. A false signal will thus be developed and applied by the inverter 52 to each of the AND gates 40*a*–40*d* resulting in each of the bit storage devices 38*a*–38*d* being set to zero (assuming that a clock pulse of appropriate duration is simultaneously applied to each of the bit storage devices 38$a$–38$d$ from clock pulse source 55 over the lead 54). As such, the first memory address, $A_0$, appearing at the output leads 59$a$–59$d$ will be zero in that a false signal representing a binary 0 will apear at each of the leads 59$a$–59$d$, which signals respectively represent a single binary bit of a binary number wherein the lead 59$a$ represents the last significant bit and the lead 59$d$ represents the most significant bit. It is understood that the required number of output leads 59$a$–59$d$, bit storage devices 38$a$–38$d$, AND gates 40$a$–40$d$, and bit adders 39$a$–39$d$ is determined by the numerical magnitude of the largest possible memory address, which memory address is dependent on the number of data elements in a data array to be processed.

Operationally, a true output signal representing a binary 1 will appear at only one of the output leads 71$a$–71$d$ of $d_j$ decoder 41, said output signal appearing over the output lead having the numerical designation which is equal to the value of $d_j$ applied from $d_j$ register 49 to said $d_j$ decoder over the composite lead 70. Thus, where $d_j$ is equal to 0, a true signal will appear at lead 71$a$ while false signals appear at leads 71$b$, 71$c$, and 71$d$. Considering the signals appearing on leads 71$a$–71$d$ as representative of a composite binary number representing the value of $D_j$, then $D_j$ would equal 1 or $2^0$. If $d_j$ is equal to 3 a true signal will appear over lead 71$c$ which is given the numerical designation $(m+n-2)$ or 3. This would represent a $D_j$ value of 8 or $2^3$. In like fashion, if $d_j$ is equal to 1 a true signal will appear only at lead 71$b$ representing a $D_j$ value of 2 or $2^1$, and if $d_j$ is equal to 4 a true signal will appear only at the output lead 71$d$ representing a $D_j$ value of 16 or $2^4$. It is to be noted that, as previously explained, $D_j$ will remain constant for each complete address sequence and will be changed at the end of each complete address sequence when an updated value of $d_j$ is stored in $d_j$ register 49 upon the application of an enabling pulse to said $d_j$ register 49 over lead 58. A true signal will thus appear at the same output lead of $d_j$ decoder 41 for a complete address sequence.

Each of the decoder output leads 71$a$–71$d$ are coupled to a chain of operatively connected components including a bit adder 39, and AND gate 40 and a bit storage device 38. The signals appearing on the decoder output leads 71$a$–71$d$ are respectively applied as the first of three input signals to each of the bit adders 39$a$–39$d$ coupled thereto, a second input signal being applied to said bit adders 39$a$–39$d$ over the leads 72$a$–72$d$, which second input signals are each representative of a bit portion of the memory addresses, $A_{l-1}$, last provided to the random access memory. A third input signal to each of the bit adders 39$a$–39$d$ is respectively applied over the leads 73$a$–73$d$. Each of the third input signals represent a bit carry from the bit adder 39 in the chain of components relating to the next least significant bit, with the exception of the third input signal to the bit adder 39$a$ over the lead 73$d$ which input signal represents the bit carry from the bit adder 39$d$.

The output signals of the bit adders 39$a$–39$d$, representative of the sum of the signals applied thereto, are respectively applied as the first of two input signals to the AND gates 40$a$–40$d$ over the leads 60$a$–60$d$. The second of said two input signals is respectively applied to the AND gates 40$a$–40$d$ from invertor 52 over the leads 61 and 62$a$–62$d$. Since a true signal will appear at the output of the OR gate 51 only in response to an initialization signal from the initializer 50 or in response to a true signal from the AND gate 74, a false signal will normally appear as an output signal from the OR gate 51. This is due to an initialization signal being applied to the first of the two input leads of the OR gate 51 only at the start of the initial or first address sequence and a true signal being applied to the second input lead of the OR gate 51 over the lead 77 only at the end of each complete address sequence. In that a false signal is normally applied as an input to the inverter 52, a true signal will be applied to each of the respective AND gates 40$a$–40$d$ over the leads 62$a$–62$d$ at all times except at the end of a complete address sequence and at the start of the initial or first address sequence. Thus, the application of a true signal to the other lead of any of the AND gates 40$a$–40$d$ over the respective leads 60$a$–60$d$ will normally result in a true signal being developed by that AND gate and applied as an input to the bit storage device coupled thereto.

The end of a complete address sequence is marked by the memory address $A_{l-1}$ (equal to $MN-1$) and denoted by a true signal appearing on each of the leads 59$a$–59$d$, which leads are respectively coupled to the input leads of the AND gate 74 by the leads 75$a$–75$d$. The end of a complete address sequence is thus detected by the AND gate 74 which will provide a true output signal, which may be referred to as a detector signal, over the lead 77 whenever true signals are simultaneously applied to each of said input leads of said AND gate 74. The detector signal will serve to reset the bit storage devices 38$a$–38$d$ to zero ($A_0$) and to cause an enabling signal to be applied to $d_j$ register 49 at the start of each new address sequence (other than the first address sequence), said enabling signal being developed by the AND gate 53 in response to true signals being simultaneously applied to both of its two input leads by the OR gate 51 and the clock pulse generator 55, respectively.

Figure 5:
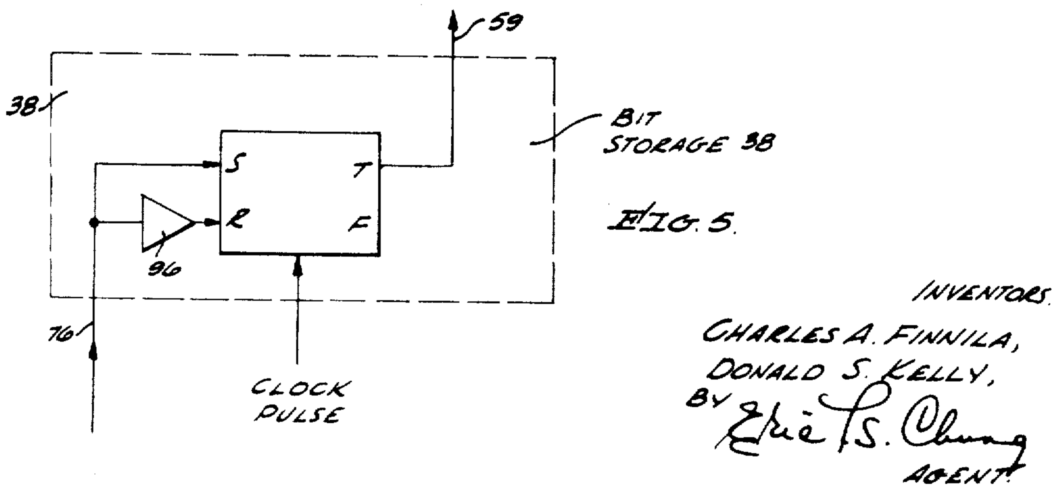
FIG. 5 is a schematic diagram illustrating an exemplary bit storage device for use in the address register of FIG. 4.

As previously mentioned, the bit storage devices 38$a$–38$d$ may comprise any of the conventional types of flip-flop devices having set and reset inputs and true and false outputs. Referring to FIG. 5, which illustrates an exemplary flip-flop device suitable for use at a bit storage device 38, an output lead 59 is coupled to the true output of said flip-flop. The flip-flop devices are intended to be operatively adapted to assume a state which is the same as the signal applied as an input thereto (upon application of a clock pulse). For example, if the flip-flop is in the true state and a true signal is applied as an input signal over the lead 76, no change of state will occur. On the other hand, if a false signal is applied as an input signal over the lead 76, the device will change (assuming the presence of a clock pulse) to the false state resulting in an output signal representative of a non-true or false level appearing at output lead 59. A similar operation takes place if the device is in the false state, a change of state occurring only when a true signal is applied as an input over the lead 76. To this end, the lead 76, is directly coupled to the set input of the flip-flop device while said lead 76 is coupled to the reset input through an inverter 96.

It is to be noted that a characteristic of the memory addresses generated by the address re-ordering system, in accordance with the invention, is that whenever the first memory address, $A_0$, in an address sequence has the numerical designation of zero, the numerical designation of the last address, $A_{(MN-1)}$, in an address sequence will always be equal to $MN-1$, which address will be the highest numerical designation for any of the addressable storage locations included in the random access memory 100. Thus, in the digital reordering system, in accordance with the invention, true signals appearing on all of the output leads 59$a$–59$d$ would represent the memory address having the highest possible numerical designation, which memory address would be equal to $MN-1$.

It is understood that the digital data reordering system involving powers of 2 which has been illustrated by FIG. 4 of the drawings, is considered to be an exemplary mechanization of such a system and that it would be within the scope and spirit of the invention to use any of various other structural combinations. For example, $d_j$ decoder 41 may be adapted to provide a composite output signal, over the leads 71$a$–71$d$, representative of the binary complement of the composite signal described in connection with the system of FIG. 4. Such a complementary $d_j$ decoder may be employed, for example, in combination with a bank of NAND gates or other standard logic having an inverted output. Bit storage devices comprising flip-flop devices operatively adapted to change states upon the application of a true signal may be used in such a system as reasonable substitutes for the devices described in connection with the address register 34 illustrated by FIG. 4.

It is further understood that the arithmetic units, such as adders 5 and 42, subtractors 7 and 45, multiplier 13, and divider 14, employed in the digital data reordering system in accordance with the invention, may be any of the various types known in the prior art. For example, a description of such arithmetic operations is included in a textbook by R. K. Richards, Arithmetic Operations in Digital Computers, Van Nostrand Co., Inc. 1960, chapters 4 and 5, pages 81 to 176. Additional descriptions of arithmetic operations may be found in a textbook by E. L. Braun, Digital Computer Design, Academic Press, Inc., 1963, pages 266 to 371, and in a textbook by Huskey and Korn, Computer Handbook, McGraw-Hill Book Co., Inc., 1962, pages 15–1 to 15–26.

While preferred embodiments of the present invention have been described hereinabove it is intended that all matter contained in the above description and shown in the accompanying drawings shall be interpreted as illustrative and not in a limiting sense and that all modifications, constructions, and arrangements which fall within the scope and spirit of the present invention may be made.

What is claimed is:

1. A system for generating address sequences which are used to provide an ordered storage and reordered retrieval of information in a random access memory having a plurality of addressable storage locations comprising:

first register means for storing memory addresses which correspond to individual addressable storage locations in said random access memory;

means for providing sequence determining constants which correspond to complete address sequences wherein stored information is retrieved once from every addressable storage location used in said memory in each complete address sequence;

first update means for updating said memory addresses as a function of the address of the storage location from which stored information was last retrieved and as a function of said sequence determining constant and the terminating address of a complete sequence; and second update means for updating said sequence determining constants after each complete address sequence as a function of the sequence determining constant from the last complete address sequence and the terminating address of a complete sequence.

2. A system as defined by claim 1 wherein said first update means comprises:

adder means for providing a sum signal representative of the sum of signals applied as inputs thereto whereby said sum signal is applied as an input signal to said first register means and stored in said first register means as updated memory address.

3. A system for generating address sequences which are used to provide an ordered storage and reordered retrieval of information in a random access memory having a plurality of addressable storage locations comprising:

first register means for storing memory addresses which correspond to individual addressable storage locations in said random access memory;

means for providing sequence determining constants which correspond to complete address sequences wherein stored information is retrieved once from every addressable storage location used in said memory in each complete address sequence;

first update means for updating said memory addresses as a function of the address of the storage location from which stored information was last retrieved and as a function of said sequence determining constant, said first update means including:

adder means for providing a sum signal representative of the sum of signals applied as inputs thereto;

comparator means for comparing the magnitude of said sum signal with a memory constant having a predetermined value and for providing an enabling signal indicative of whether or not the magnitude of said sum signal is greater than said memory constant;

subtractor means for providing a difference signal representative of that amount by which said sum signal exceeds said memory constant; and gating means operatively coupled to said comparator means and to said subtractor means for selectively allowing updated memory address signals to be applied to said first register means in response to said enabling signal whereby said sum signal is applied to said first register means as an updated memory address signal whenever said sum signal is not greater than said memory constant and said difference signal is applied to said first register means as an updated memory address signal whenever said sum signal is greater than said memory constant; and second update means for updating said sequence determining constants after each complete address sequence.

4. A system as defined by claim 3 wherein said adder means comprises:

first input means for applying to said adder means a first input signal representative of the memory address corresponding to the addressable storage location from which stored information was last retrieved; and second input means for applying to said adder means a second input signal representative of the sequence determining constant stored in said means for providing sequence determining constants.

5. A system as defined by claim 4 wherein said gating means comprises:

a first gate operatively coupled to said first register means;

second gate means for applying said sum signal to said first gate wherein said second gate means is responsive to said enabling signal whenever said enabling signal has a first binary level signifying that said sum signal is not greater than said memory constant; and third gate means for applying said difference signal to said first gate wherein said third gate means is responsive to said enabling signal whenever said enabling signal has a second binary level signifying that said sum signal is greater than said memory constant, whereby the output signal developed by said first gate is representative of the memory address of the addressable storage location in which information is to be next stored and from which information is to be next retrieved.

6. A system as defined by claim 5 wherein said second update means comprises:

multiplier means for providing a multiplier signal representative of the product of the sequence determining constant provided by said means for providing sequence determining constants and a data array parameter corresponding to the number of data sets in said data array to be stored in said random access memory; and divider means for modifying said multiplier signal by division by said memory constant wherein an output signal representative of the remainder resulting from said division is applied to said means for providing sequence determining constants for storage as an updated sequence determining constant.

7. A system as defined by claim 6 wherein said second update means further comprises:

detector means for detecting the end of each complete address sequence wherein said detector means is operatively adapted to provide a detector signal to said means for providing sequence determining constants at the end of each complete address sequence thereby enabling the divider output signal to be stored in said means for providing sequence determining constants as an updated sequence determining constant.

8. A system as defined by claim 7 wherein said system further comprises:

clock means for providing a series of clock pulses wherein said clock pulses are applied to both said first register means and said means for providing sequence determining constants; and initialization means for generating an initialization signal for setting said first register means and said means for providing sequence determining constants at predetermined values respectively respective of a predetermined memory address and a sequence determining constant.

9. A system for generating address sequences which are used to provide an ordered storage and reordered retrieval of information in a random access memory having a plurality of addressable storage locations comprising:

first register means for storing memory addresses which correspond to individual addressable storage locations in said random access memory;

means for providing sequence determining constants which correspond to complete address sequences wherein stored information is retrieved once from every addressable storage location used in said memory in each complete address sequence;

first update means for updating said memory addresses as a function of the address of the storage location from which stored information was last retrieved and as a function of said sequence determining constant, said first update means including adder means for providing a sum signal representative of the sum of signals applied as inputs thereto whereby said sum signal is applied as an input signal to said first register means and stored in said first register means as updated memory address; and second update means for updating said sequence determining constants after each complete address sequence, said second update means including:

adder means for providing a sum signal representative of the sum of signals applied as inputs thereto;

comparator means for comparing the magnitude of said sum signal with a memory constant having a predetermined value and for providing an enabling signal having a first binary level signifying that said sum signal is greater than or equal to said memory constant and having a second binary level signifying that said sum signal is less than said memory constant;

subtractor means for providing a difference signal representative of that amount by which said sum signal exceeds said memory constant;

second register means for storing sequence determining constant exponent signals; and gating means operatively coupled to said comparator means and said subtractor means for selectively allowing updated sequence determining constant exponent signals to be applied to said second register means in response to said enabling signal whereby said sum signal is applied to said second register means as an updated sequence determining constant exponent signal whenever said sum signal is less than said memory constant and said difference signal is applied to said second register means as an updated sequence determining constant exponent signal whenever said sum signal is greater than or equal to said memory constant.

10. A system as defined by claim 9 wherein said adder means comprises:

first input means for applying to said adder means a first input signal representative of the sequence determining constant exponent signal stored in said second register means; and second input means for applying to said adder means a second input signal representative of a data array parameter exponent whereby said data array parameter exponent is a function of the number of data sets to be stored in said random access memory.

11. A system as defined by claim 10 wherein said gating means comprises:

a first gate operatively coupled to said second register means;

second gate means for applying said difference signal to said first gate wherein said second gate means is responsive to said enabling signal whenever said enabling signal has said first binary level; and third gate means for applying said sum signal to said first gate wherein said third gate means is responsive to said enabling signal whenever said enabling signal has said second binary level whereby the output signal developed by said first gate is stored in said second register means as an updated sequence determining constant exponent signal.

12. A system for generating a series of memory addresses for providing an ordered storage and reordered retrieval of information stored as data elements in a random access memory having at least MN addressable storage locations wherein N represents the number of data sets in each data array to be stored and M represents the number of data elements in each data set, said system comprising:

register means for storing memory addresses $A_i$ which correspond to individual addressable storage locations in said random access memory;

means for providing sequence determining constants $D_j$ which correspond to complete address sequences;

first update means for providing updated memory addresses to said register means wherein said memory addresses are updated in accordance with the equation $$A_i = A_{i-1} +_{MN-1} D_j$$

second update means for providing updated sequence determining constants to said means for providing sequence determining constants $D_j$ wherein said sequence determining constants $D_j$ are updated after each address sequence in accordance with the equation $$D_j = D_{j-1} \times_{MN-1} N$$

13. A system as defined by claim 12 wherein said first update means comprises:

adder means for providing a sum signal representative of the sum of signals applied as inputs thereto;

comparator means for comparing the magnitude of said sum signal with a memory constant $MN-1$ and for providing an enabling signal indicative of whether or not the magnitude of said sum signal is greater than said memory constant $MN-1$;

subtractor means for providing a difference signal representative of that amount by which said sum signal exceeds said memory constant $MN-1$; and gating means operatively coupled to said comparator means and to said subtractor means for selectivey allowing updated memory address signals to be applied to said register means in response to said enabling signal whereby said sum signal is applied to said register means as an updated memory address signal whenever said sum signal is less than said memory constant $MN-1$ and said difference signal is applied to said register means as an updated address signal whenever said sum signal is greater than said memory constant $MN-1$.

14. A system as defined by claim 13 wherein said adder means comprises:

first input means for applying to said adder means a first input signal $A_{i-1}$, representative of the memory address of the addressable storage location from which stored information was last retrieved; and second input means for applying to said adder means a second input signal $D_j$, representative of the sequence determining constant stored in said means for providing sequence determining constants $D_j$.

15. A system as defined by claim 14 wherein said gating means comprises:

a first gate;

second gate means for applying said sum signal to said first gate in response to said enabling signal whenever said enabling signal has a first binary level signifying that said sum signal is not greater than said memory constant $MN-1$; and third gate means for applying said difference signal to said first gate in response to said enabling signal whenever said enabling signal has a first binary level signifying that said sum signal is greater than said memory constant $MN-1$ whereby the output signal of said first gate is representative of the memory address of the addressable storage location in which information is to be next stored and from which information is to be next retrieved.

16. A system as defined by claim 15 wherein said second update means comprises:

multiplier means for providing a multiplier signal representative of the product of the sequence determining constant $D_j$ stored in said means for providing sequence determining constants $D_j$ and a data array parameter N corresponding to the number of data sets in a data array to be stored in said random access memory; and divider means for modifying said multiplier signal by division by said memory constant wherein an output signal representative of the remainder resulting from said division is applied to said means for providing sequence determining constants $D_j$ for storage as an updated sequence determining constant.

17. A system as defined by claim 16 wherein said second update means further comprises:

detector means for detecting the end of each complete address sequence wherein said detector means is operatively adapted to provide a detector signal to said means for providing sequence determining constants $D_j$ at the end of each complete address sequence thereby enabling the divider output signal to be stored in said means for providing sequence determining constants $D_j$ as an updated sequence determining constant.

18. A method of reordering data arrays from a storage device enabling said data arrays to be stored in a first time sequence of data elements corresponding to the time sequence in which data elements to be stored are available for storage and retrieved for processing in a second time sequence of data elements comprising the steps of:

sequentially retrieving stored data elements of a stored data array from the addressable storage locations in which said data elements are stored in the order of said second time sequence of data elements; and sequentially storing data elements of a data array to be stored in the addressable storage locations vacated by the retrieval of stored data elements in the order of said first time sequence of data elements, each data element being stored alternately with the retrieving of a data element at the same addressable storage location.

References Cited

UNITED STATES PATENTS

| | | | |
|---|---|---|---|
| 3,163,850 | 12/1964 | Austin et al. ______ | 340—172.5 |
| 3,267,433 | 8/1966 | Falkoff ___________ | 340—172.5 |
| 3,293,615 | 12/1966 | Mullery et al. ____ | 340—172.5 |
| 3,299,411 | 1/1967 | Capozzi et al. _____ | 340—172.5 |
| 3,331,056 | 7/1967 | Lethin et al. _____ | 340—172.5 |

PAUL J. HENON, Primary Examiner

S. CHIRLIN, Assistant Examiner

PO-1050
(5/69)

UNITED STATES PATENT OFFICE
CERTIFICATE OF CORRECTION

Patent No. 3,564,505 Dated February 16, 1971

Inventor(s) Charles A. Finnila et al.

It is certified that error appears in the above-identified patent and that said Letters Patent are hereby corrected as shown below:

Col. 2, line 56, "location" should be --locations--.
Col. 3, line 23, "arrary" should be --array--;
Col. 3, line 55, "erences" should be --erence--.
Col. 4, line 20, "$0 \leq A_j \leq MN-1$" should be --$0 \leq A_i \leq MN-1$--;
Col. 4, line 35, "$A_{j-1}+D_j \geq MN$" should be --$A_{i-1}+D_j \geq MN$--.
Col. 6, line 3, "deteching" should be --detecting--.
Col. 10, line 60, "accomodate" should be --accommodate--.
Col. 13, line 8, "last" should be --least--.
Col. 17, line 21, "respective" should be --representative--.
Col. 18, line 47, after the equation insert --; and--.

Signed and sealed this 25th day of April 1972.

(SEAL)
Attest:

EDWARD M.FLETCHER,JR.
Attesting Officer

ROBERT GOTTSCHALK
Commissioner of Patents